US008402544B1

United States Patent
Soubramanien et al.

(10) Patent No.: US 8,402,544 B1
(45) Date of Patent: Mar. 19, 2013

(54) INCREMENTAL SCANNING OF COMPUTER FILES FOR MALICIOUS CODES

(75) Inventors: Viswa Soubramanien, Santa Clara, CA (US); Shaohong Wei, Sunnyvale, CA (US)

(73) Assignee: Trend Micro Incorporated, Tokyo (JP)

( * ) Notice: Subject to any disclaimer, the term of this patent is extended or adjusted under 35 U.S.C. 154(b) by 1121 days.

(21) Appl. No.: 12/341,096

(22) Filed: Dec. 22, 2008

(51) Int. Cl.
G06F 11/00 (2006.01)

(52) U.S. Cl. ............. 726/24; 726/25; 713/150; 713/194

(58) Field of Classification Search .................... 726/24, 726/25; 713/150, 194
See application file for complete search history.

(56) References Cited

U.S. PATENT DOCUMENTS

| 7,155,461 | B2 | 12/2006 | Miyata et al. |
| 7,188,369 | B2 * | 3/2007 | Ho et al. ........................ 726/24 |
| 7,228,565 | B2 | 6/2007 | Wolff et al. |
| 7,254,811 | B2 * | 8/2007 | Kouznetsov et al. ......... 717/173 |
| 7,389,539 | B1 * | 6/2008 | Kouznetsov ................... 726/22 |
| 7,392,542 | B2 | 6/2008 | Bucher |
| 7,634,262 | B1 * | 12/2009 | Li ................................. 455/419 |
| 7,707,635 | B1 * | 4/2010 | Kuo et al. ....................... 726/24 |
| 7,854,006 | B1 * | 12/2010 | Andruss et al. ................. 726/24 |
| 7,865,957 | B1 * | 1/2011 | Gu et al. ......................... 726/24 |
| 8,087,084 | B1 * | 12/2011 | Andruss et al. ................. 726/24 |
| 8,122,507 | B1 * | 2/2012 | Andruss et al. ................. 726/24 |
| 8,205,261 | B1 * | 6/2012 | Andruss et al. ................. 726/24 |
| 8,244,997 | B2 * | 8/2012 | Teranishi et al. ............. 711/162 |
| 2002/0124181 | A1 * | 9/2002 | Nambu ........................ 713/200 |
| 2004/0209608 | A1 * | 10/2004 | Kouznetsov et al. ......... 455/418 |
| 2005/0055559 | A1 | 3/2005 | Bucher |
| 2005/0064859 | A1 * | 3/2005 | Kotzin et al. ................. 455/419 |
| 2005/0273779 | A1 | 12/2005 | Cheng et al. |
| 2006/0031430 | A1 * | 2/2006 | Lee .............................. 709/220 |
| 2006/0080737 | A1 * | 4/2006 | Freeman et al. ............... 726/24 |
| 2006/0130037 | A1 * | 6/2006 | Mackay ...................... 717/168 |
| 2006/0242686 | A1 * | 10/2006 | Toda et al. ........................ 726/3 |
| 2007/0094539 | A1 | 4/2007 | Nakatsuka et al. |
| 2008/0282350 | A1 | 11/2008 | Khilnani et al. |
| 2008/0282351 | A1 | 11/2008 | Khilnani et al. |
| 2009/0064329 | A1 * | 3/2009 | Okumura et al. ............... 726/22 |

* cited by examiner

*Primary Examiner* — April Shan
(74) *Attorney, Agent, or Firm* — Okamoto & Benedicto LLP

(57) ABSTRACT

Incremental scanning of files for malicious codes. A file may be scanned for malicious codes in a first scanning instance in a client computer using a pattern of malicious code signatures. Thereafter, an update to the pattern for generating an updated pattern is received in the client computer. A delta pattern may be generated based on a difference between the pattern and the updated pattern. In a second scanning instance, the file may be rescanned using the delta pattern.

15 Claims, 4 Drawing Sheets

INCREMENTAL SCANNING OF COMPUTER FILES FOR MALICIOUS CODES

BACKGROUND OF THE INVENTION

1. Field of the Invention

The present invention relates generally to computer security, and more particularly but not exclusively to methods and apparatus for scanning files for malicious codes.

2. Description of the Background Art

Computer viruses, worms, Trojans, rootkits, and spyware are examples of malicious codes that have plagued computer systems throughout the world. Although there are technical differences between each type of malicious code, malicious codes are also collectively referred to herein as "viruses." Malicious codes have become so prevalent that experienced computer users have some form of antivirus in their computers. Antivirus for scanning computer files for malicious codes is commercially available from several vendors, including Trend Micro, Inc. A typical antivirus includes a scan engine and a pattern containing signatures of malicious codes and other information for identifying malicious codes. Generally speaking, the scan engine scans a target file for malicious codes by comparing the target file's contents against the malicious code signatures in the pattern. The pattern is periodically updated to include new information about known or newly discovered malicious codes. When the pattern is updated, files that have been scanned using a previous pattern may have to be rescanned as they may be infected by viruses that cannot be detected using the previous pattern.

SUMMARY

In one embodiment, a file may be scanned for malicious codes in a first scanning instance in a client computer using a pattern comprising malicious code signatures. Thereafter, an update to the pattern for generating an updated pattern is received in the client computer. A delta pattern may be generated based on a difference between the pattern and the updated pattern. In a second scanning instance, the file may be rescanned using the delta pattern.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 1:
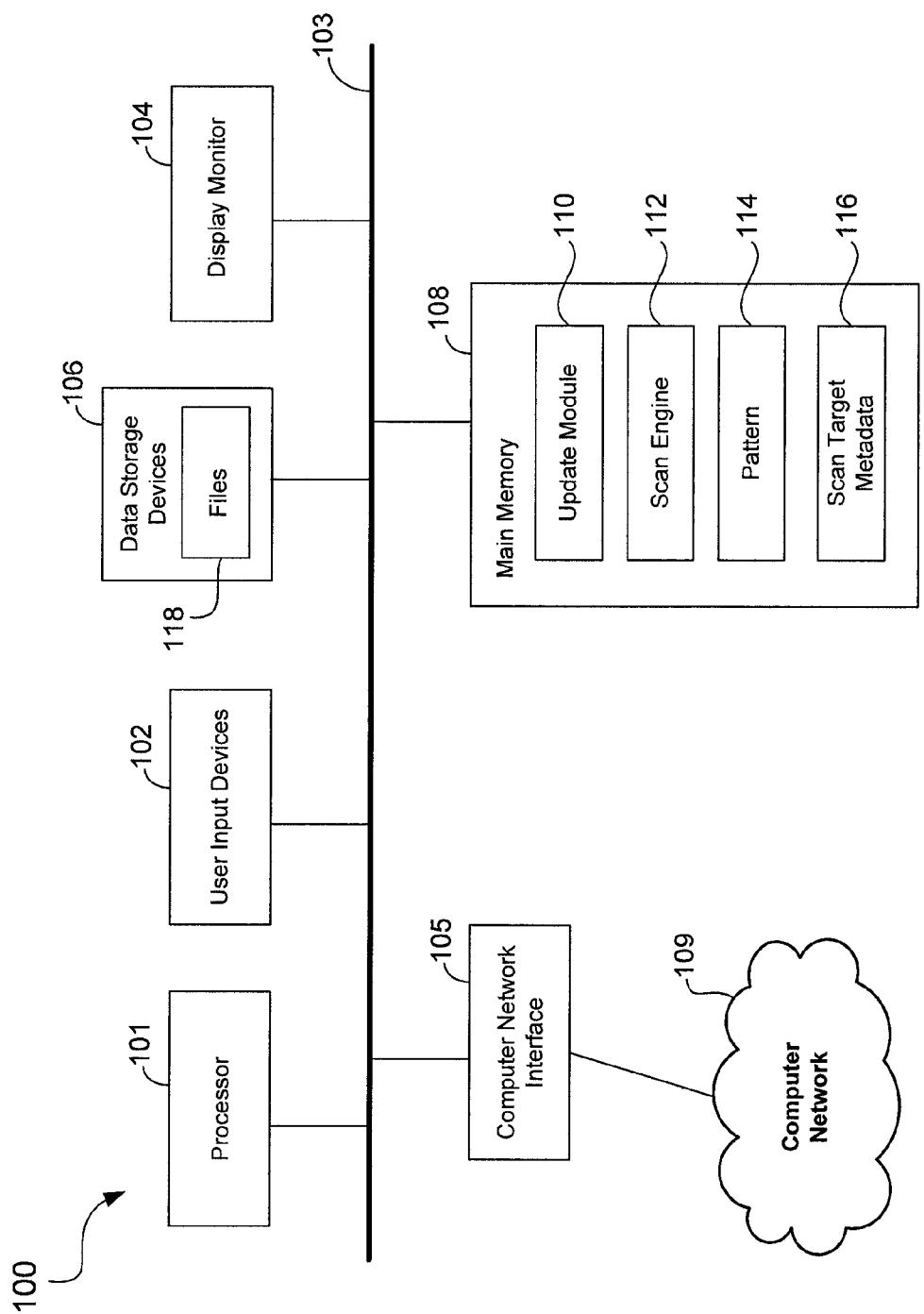
FIG. 1 shows a schematic diagram of a client computer in accordance with an embodiment of the present invention.

Referring now to FIG. 1, there is shown a schematic diagram of a client computer 100 in accordance with an embodiment of the present invention. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM). The computer network interface 105 may be coupled to a computer network 109, which in this example includes the Internet.

In the example of FIG. 1, the main memory 108 includes scanning software comprising an update module 110, a scan engine 112, a pattern 114, and scan target metadata 116. These components may be loaded from the data storage device 106 to the main memory 108 for execution by the processor 101. The data storage device 106 may store one or more files 118. As will be more apparent below, a file 118 may be incrementally scanned by the scanning software for malicious codes.

The update module 110 may comprise computer-readable program code for updating the pattern 114. In one embodiment, the update module 110 is configured to communicate with one or more update servers (e.g., see update server 201 in FIG. 2) to receive updates for the pattern 114. The update module 110 may be configured to receive a pattern update from an update server and use the pattern update to replace the pattern 114 or update the pattern 114. The update module 110 may also be configured to generate a delta pattern comprising a difference between the pattern 114 and an updated version of the pattern 114 (which is labeled in FIG. 2 as the pattern 115). If the pattern update is an incremental update, the update module 110 may simply use the pattern update as the delta pattern. If the pattern update is a full update, i.e., a direct replacement for the pattern 114, the update module 110 may generate the delta pattern on the fly as needed or after receiving the pattern update. The pattern 114, the pattern update, and the delta pattern may be in separate files, referred to as "pattern files," and comprise sets of malicious code signatures.

The scan engine 112 may comprise computer-readable program code for scanning a file or other data unit for malicious codes. The scan engine 112 may use a pattern matching algorithm, for example. In one embodiment, the scan engine 112 is configured to generate metadata of a file it has scanned. The scanned file metadata may include the date and time the file was scanned, a hash of the file taken right before or after it was scanned, and the information about the malicious code signatures used to scan the file. The scan engine 112 may be configured to check the metadata of a target file to be scanned to identify the signatures used to previously scan the target file, if any. To minimize scan time, the scan engine 112 may rescan previously scanned target files using new signatures that were not previously used to scan the target file. That is, the scan engine 112 may be configured to rescan the target file without using all or a substantial portion of signatures previously used to scan the target file. In one embodiment, the scan engine 112 may be configured to perform a rescan using only a subset (instead of entirety) of malicious code signatures in a latest full pattern.

The pattern 114 may comprise malicious code signatures and other information for identifying malicious codes. A malicious code signature may include signature metadata comprising a signature ID (identification), a version number, and action date (when modified or created). The signature metadata may be included in the metadata of a scanned file. This allows the scan engine 112 to determine if a malicious code signature has been previously used to scan a particular file.

The scan target metadata 116 may comprise metadata of files scanned by the scan engine 112. The metadata 116 may indicate the scanned file's hash taken right before or right after the file was scanned, the date and time the file was scanned, and the ID and version number of malicious code signatures used to scan the file.

Figure 2:
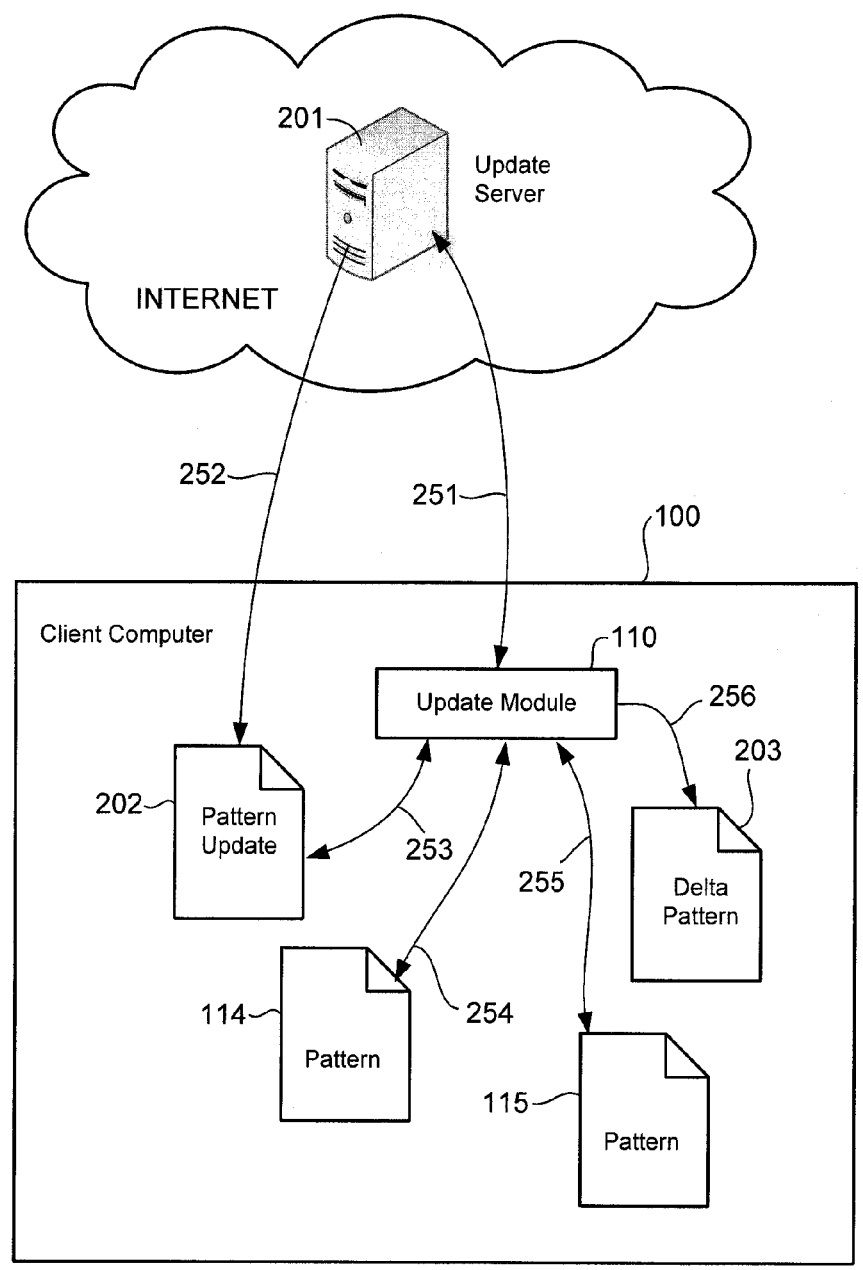
FIG. 2 shows a flow diagram schematically illustrating the operation of an update module in accordance with an embodiment of the present invention.

FIG. 2 shows a flow diagram schematically illustrating the operation of the update module 110 in accordance with an embodiment of the present invention. In the flow diagram of FIG. 2, the update module 110 running in the client computer 100 requests the update server 201 for pattern updates (arrow 251). The update server 201 may comprise a server computer maintained, operated, or commissioned by a vendor of the scanning software that includes the update module 110, the scan engine 112, the pattern 114, and the scan target metadata 116. For example, the update server 201 may be part of a content distribution network (CDN), such as that by Akamai Technologies. In this example, the pattern 114 is the currently available and latest pattern in the client computer 100 and the update module 110 polls the update server 201 from time to time for updates to the pattern 114. The pattern 114 may be in a pattern file.

In response to the request for update from the update module 110, the update server 201 provides a pattern update 202 to the client computer 100 (arrow 252). The pattern update 202 may be in a file separate from that of the pattern 114. Depending on implementation, the update module 110 may be configured to receive incremental or full pattern updates.

In the case where the pattern update 202 is incremental, i.e., does not replace the entirety of the pattern 114, the update module 110 may be configured to merge the pattern update 202 with the pattern 114 (arrows 253, 254, and 255) to generate an updated full pattern 115 and store the updated pattern 115 as a separate file. The update module 110 may use a copy of the pattern update 202 as a delta pattern 203 (arrow 256). In that example where a copy of the pattern update 202 is used as the delta pattern 203, the pattern update 202 and the delta pattern 203 may have the same or substantially the same malicious code signatures.

In the case where the pattern update 202 is a full pattern update, the update module 110 may be configured to generate the delta pattern 203 (arrow 256) from the difference between the patterns 114 and 115 (arrows 254 and 255). In that example, the pattern update 202 may be used as the full pattern 115. The update module 110 may generate the delta pattern 203 on the fly as needed or at a time after receiving the pattern update 202. One or more delta patterns 203 may be maintained in the client computer 100 to allow for incremental scanning of files that have been previously scanned using different versions of the pattern.

In general, regardless of whether the pattern update 202 is incremental or full, the delta pattern 203 may have a subset of malicious code signatures present in the updated pattern 115. In the example of FIG. 2, the pattern update 202 and the pattern 115 may be in separate files, and the delta pattern 203 may be in a file separate from those of the pattern update 202 and the pattern 115. The delta pattern 203 may be generated based on a difference between the patterns 114 and 115.

The pattern update 202 and the pattern 114 may comprise first and second set of malicious code signatures, respectively. The delta pattern 203 may comprise a third set of malicious code signatures having malicious code signatures present in the pattern update 202 but not in the pattern 114, which at this point is now an old version of the pattern. Because the delta pattern 203 is a subset of the updated full pattern 115, the delta pattern 203 may exclusively contain only those malicious code signatures not present in the old pattern 114, any subset of malicious code signatures present in the updated full pattern 115, or simply the difference between the patterns 114 and 115.

Figure 3:
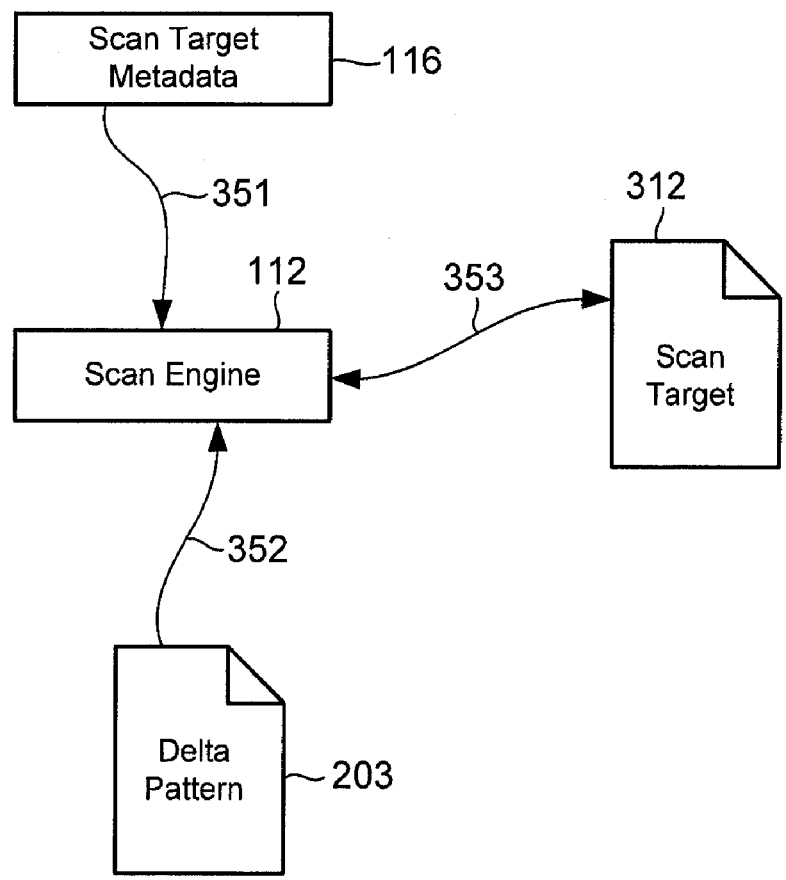
FIG. 3 shows a flow diagram schematically illustrating incremental scanning of a file for malicious codes in accordance with an embodiment of the present invention.

FIG. 3 shows a flow diagram schematically illustrating incremental file scanning in accordance with an embodiment of the present invention. After receiving an update pattern 202, the scan engine 112 may proceed with scanning or rescanning files 118 in the client computer 100. The files 118 to be scanned or rescanned are also referred to as "scan targets." In the example of FIG. 3, the scan engine 112 retrieves the scan target metadata 116 of the scan target 312 (arrow 351). The scan target 312 may comprise a file 118 in the client computer 100. If the scan target 312 does not have corresponding metadata, indicating it has not been previously scanned, the scan engine 112 simply scans the scan target 312 using the entirety of the latest full pattern 115.

In the example of FIG. 3, the scan target 312 has been previously scanned by the scan engine 112 in a first scanning instance using the previous pattern 114. In that first scanning instance, the scan engine 112 created the scan target metadata 116 for the scan target 312. The scan engine 112 calculates the hash of the scan target 312 and compares it to the hash value indicated in the scan target metadata 116 to ensure that the scan target 312 has not been modified since the last scan. If the scan target 312 has been modified, the scan engine 112 preferably scans the scan target 312 using the full pattern 115.

If the scan target 312 has not been modified since the first scanning instance, the scan engine 112 checks the scan target metadata 116 to identify the malicious code signatures used in the first scanning instance. This allows the scan engine 112 to determine and retrieve the delta pattern 203 to be used to rescan the scan target 312 for malicious codes (arrow 352). The scan engine 112 then proceeds to rescan the scan target 312 for malicious codes using the delta pattern 203 (arrow 353) instead of the pattern 115 in a second scanning instance. By rescanning the scan target 312 using the delta pattern 203, which has less malicious code signatures than the latest full pattern 115 currently available in the client computer 100, the scan engine 112 can perform scanning more efficiently and using less computing resources. The scan target 312 does not have to be rescanned using a full pattern unless it has been modified.

As can be appreciated from the foregoing, the update module 110 may generate delta patterns 203 between different versions of the pattern file. In the example of FIG. 3, the delta pattern 203 may represent the difference between the pattern 114 (version prior to pattern 115) and the pattern 115 (latest). In the event the scan target metadata 116 of the scan target 312 indicates that it has been scanned by a version of the pattern prior to the pattern 114, the update module 110 may generate a particular delta pattern that reflects the difference between the pattern 115 and the prior version of the pattern. The scan engine 112 may use that particular delta pattern to rescan the scan target 312 for malicious codes.

Figure 4:
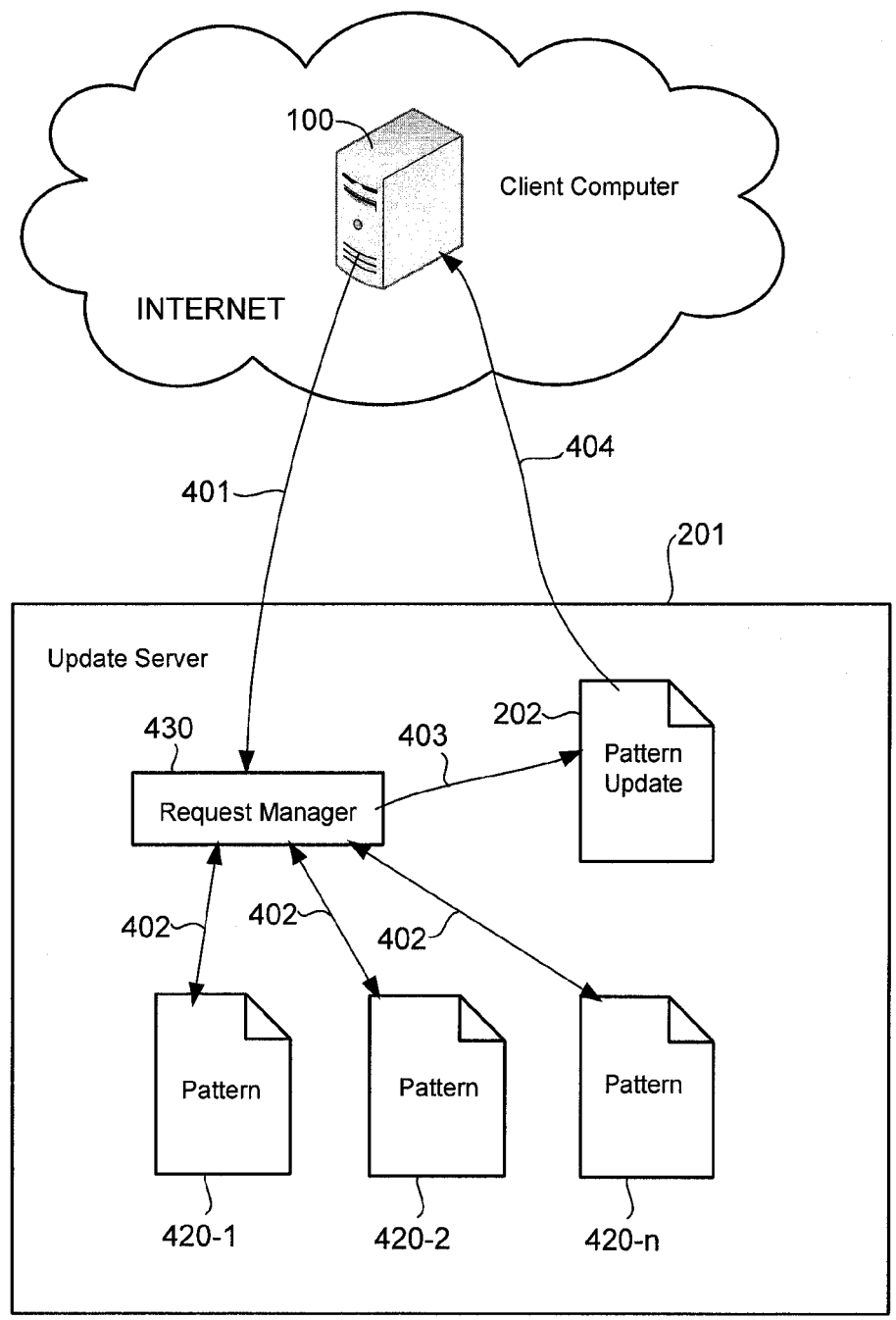
FIG. 4 shows a flow diagram schematically illustrating generation and distribution of pattern updates to client computers in accordance with an embodiment of the present invention.

Referring now to FIG. 4, there is shown a flow diagram schematically illustrating generation and distribution of pattern updates to client computers in accordance with an embodiment of the present invention. In the example of FIG. 4, the update server 201 maintains different versions of patterns (labeled as 420-1, 420-2, . . . , 420-n) for use by a scan engine 112 to detect malicious codes. A request manager 430 may comprise computer-readable program code for servicing requests for pattern updates from client computers 100 (arrow 401). Only one client computer 100 is shown in FIG. 4 for clarity of illustration. The request for pattern update may include version information or signature metadata of a current pattern in the client computer 100.

In the case where the pattern update 202 is incremental, the request manager 430 may retrieve a copy of the current pattern in the client computer 100 and the latest pattern available in the update server 201 (arrow 402). The request manager 430 may generate the pattern update 202 (arrow 403) based on the difference between the current pattern in the client computer 100 and the latest pattern in the update server 201. The request manager 430 may then forward the pattern update 202 to the requesting client computer 100 (arrow 404).

In the case where the pattern update 202 is a full pattern update, the request manager 430 may service the request for pattern update by retrieving the latest pattern available in the update server 201 (arrow 402). The request manager 430 may prepare the latest pattern as a pattern update 202 (arrow 403), and then send the pattern update 202 to the requesting client computer 100 (arrow 404).

Methods and apparatus for incremental scanning files for malicious codes have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of incrementally scanning a file for malicious codes, the method to be performed by a client computer and comprising:
scanning the file for the malicious codes using a first set of malicious code signatures in a first scanning instance in a client computer;
generating a metadata for the file, the metadata for the file identifying the first set of malicious code signatures employed to scan the file in the first scanning instance;
receiving a second set of malicious code signatures in the client computer after the first scanning instance;
checking the metadata for the file to identify a third set of malicious code signatures, the third set of malicious code signatures comprising malicious code signatures present in the second set of malicious code signatures but not in the first set of malicious code signatures; and
rescanning the file for the malicious codes using the third set of malicious code signatures in a second scanning instance, the second scanning instance being after receiving the second set of malicious code signatures in the client computer.

2. The method of claim 1 wherein the metadata for the file comprises a hash of the file taken in the first scanning instance and further comprising:
prior to rescanning the file, comparing hash values of the file to determine when if the file has been modified since the first scanning instance; and
instead of rescanning the file using the third set of malicious code signatures, rescanning the file using a fourth set of malicious code signatures in the second scanning instance when the comparison of the hash values indicate that the file has been modified since the first scanning instance, the fourth set of malicious code signatures comprising malicious code signatures present in both the first and second set of malicious code signatures.

3. The method of claim 1 further comprising:
storing the third set of malicious code signatures as a pattern file separate from pattern files of the first and second set of malicious code signatures.

4. The method of claim 1 wherein the second set of malicious code signatures is received from an update server as a pattern update to the second set of malicious code signatures.

5. The method of claim 1 wherein the third set of malicious code signatures and the second set of malicious code signatures are the same.

6. A method of incrementally scanning a file for malicious codes, the method to be performed by a client computer and comprising:
requesting a pattern update from an update server;
receiving the pattern update in the client computer, the pattern update being an update to a first pattern present in the client computer and used to scan the file for the malicious codes;
generating a delta pattern, the delta pattern comprising a difference between the first pattern and a second pattern, the second pattern being the first pattern updated with the pattern update; and
using the delta pattern to rescan the file for the malicious codes.

7. The method of claim 6 wherein the delta pattern comprises malicious code signatures present in the pattern update but not in the first pattern.

8. The method of claim 6 wherein the delta pattern and the pattern update have the same malicious code signatures.

9. The method of claim 6 further comprising:
generating metadata of the file after scanning the file using the first pattern to scan the file for malicious codes; and
consulting the metadata of the file to determine malicious code signatures in the first pattern employed to scan the file.

10. The method of claim 9 wherein consulting the metadata of the file to determine malicious code signatures in the first pattern employed to scan the file comprises looking up signature ID and version number of the malicious code signatures in the first pattern employed to scan the file.

11. The method of claim 6 further comprising:
generating metadata of the file after scanning the file using the first pattern to scan the file for malicious codes; and
consulting the metadata of the file to determine when if the file has been amended since it was scanned using the first pattern.

12. The method of claim 11 wherein consulting the metadata of the file to determine when the file has been amended since it was scanned using the first pattern comprises comparing a hash value of the file indicated in the metadata of the file against a current hash value of the file.

13. The method of claim 6 further comprising:

merging the pattern update with the first pattern to generate a second pattern.

14. A method of incrementally scanning a file for malicious codes, the method to be performed by a client computer and comprising:

scanning the file for the malicious codes using a first pattern in a first scanning instance in the client computer;

receiving a pattern update in the client computer after the first scanning instance, the pattern update being used to update the first pattern to a second pattern;

identifying a third pattern, the third pattern comprising malicious code signatures present in the second pattern but not in the first pattern; and rescanning the file for the malicious codes using the third pattern in a second scanning instance, the second scanning instance being after receiving the second pattern in the client computer.

15. The method of claim 14 wherein the second pattern and the first pattern are in separate files and the third pattern is in another file generated based on a difference between the first pattern and the second pattern.

* * * * *